(12) United States Patent
Diop et al.

(10) Patent No.: US 9,126,515 B2
(45) Date of Patent: Sep. 8, 2015

(54) MULTI-CONTOUR BLADDER SYSTEM

(71) Applicant: Ford Global Technologies, LLC, Dearborn, MI (US)

(72) Inventors: Mbathie Diop, Warren, MI (US); Christian J. Hosbach, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 13/956,450

(22) Filed: Aug. 1, 2013

(65) Prior Publication Data

US 2015/0035323 A1 Feb. 5, 2015

(51) Int. Cl.
*B60N 2/56* (2006.01)

(52) U.S. Cl.
CPC .................... *B60N 2/5621* (2013.01)

(58) Field of Classification Search
CPC ............... B60N 2/525; B60N 2/5621
USPC ............... 297/284.4, 452.14, 180.14
See application file for complete search history.

(56) References Cited

U.S. PATENT DOCUMENTS

| | | | | | |
|---|---|---|---|---|---|
| 3,029,109 | A | * | 4/1962 | Nail | 297/461 |
| 4,279,044 | A | * | 7/1981 | Douglas | 5/714 |
| 4,542,547 | A | * | 9/1985 | Sato | 5/713 |
| 5,226,188 | A | | 7/1993 | Liou | |
| 5,416,935 | A | * | 5/1995 | Nieh | 5/423 |
| 5,483,709 | A | * | 1/1996 | Foster et al. | 5/81.1 R |
| 5,561,873 | A | * | 10/1996 | Weedling | 5/713 |
| 5,590,428 | A | * | 1/1997 | Roter | 5/726 |
| 5,655,239 | A | * | 8/1997 | Caparon et al. | 5/713 |
| 5,890,245 | A | * | 4/1999 | Klearman et al. | 5/714 |
| 5,963,997 | A | * | 10/1999 | Hagopian | 5/654 |
| 6,273,810 | B1 | | 8/2001 | Rhodes, Jr. et al. | |
| 6,354,665 | B1 | * | 3/2002 | Ross | 297/452.41 |
| 7,533,941 | B2 | | 5/2009 | Saitou et al. | |
| 8,033,600 | B2 | | 10/2011 | Reynolds et al. | |
| 8,147,000 | B1 | * | 4/2012 | Drake | 297/452.41 |
| 8,360,517 | B2 | | 1/2013 | Lazanja et al. | |
| 2007/0063552 | A1 | * | 3/2007 | Wang et al. | 297/180.11 |
| 2007/0138844 | A1 | * | 6/2007 | Kim | 297/180.11 |

(Continued)

FOREIGN PATENT DOCUMENTS

FR  2694527 A1  2/1994

OTHER PUBLICATIONS

Mercedes-Benz, "Integral seats with massage function and ventilation: New luxury coupe offers wellness on wheels," DaimlerChrysler Communications, Stuttgart (Germany), Auburn Hills (USA), Aug. 21, 2006 (5 pages).

*Primary Examiner* — David R Dunn
*Assistant Examiner* — Timothy J Brindley
(74) *Attorney, Agent, or Firm* — Vichit Chea; Price Heneveld LLP (57) ABSTRACT

A vehicle seating assembly includes a seat base and a seat back. A cover stock is disposed over the seat back and the seat base. An inflatable bladder is disposed in at least one of the seat base and the seat back and is configured to be in a first position, wherein the bladder is deflated, and a second position, wherein the bladder is inflated. The bladder includes at least one orifice extending completely through the inflatable bladder. A fan is operably coupled to the at least one orifice and is configured to move air through the at least one orifice and the cover stock, thereby providing air flow to a vehicle passenger.

20 Claims, 5 Drawing Sheets

(56) References Cited

U.S. PATENT DOCUMENTS

| | | | |
|---|---|---|---|
| 2008/0052834 A1* | 3/2008 | Hill | 5/655.9 |
| 2010/0122408 A1* | 5/2010 | Mafi et al. | 4/578.1 |
| 2010/0295339 A1* | 11/2010 | Siu | 297/180.14 |
| 2011/0067178 A1* | 3/2011 | Lee | 5/423 |
| 2011/0089741 A1* | 4/2011 | Cyr | 297/452.41 |
| 2011/0260509 A1* | 10/2011 | Siu | 297/180.14 |
| 2013/0099550 A1 | 4/2013 | Ota et al. | |

* cited by examiner

MULTI-CONTOUR BLADDER SYSTEM

FIELD OF THE INVENTION

The present invention generally relates to a vehicle seating assembly, and more particularly to a vehicle seating assembly having a bladder system for providing air flow to a vehicle passenger.

BACKGROUND OF THE INVENTION

Vehicles that include improved air flow technology increase comfort and value to the consumer.

SUMMARY OF THE INVENTION

According to one aspect of the present invention, a vehicle seating assembly includes a seat base and a seat back. A cover stock is disposed over the seat back and the seat base. An inflatable bladder is disposed in at least one of the seat base and the seat back and is configured to be in a first position, wherein the bladder is deflated, and a second position, wherein the bladder is inflated. The bladder includes at least one orifice extending completely through the inflatable bladder. A fan is operably coupled to the at least one orifice and is configured to move air through the at least one orifice and the cover stock, thereby providing air flow to a vehicle passenger.

According to another aspect of the present invention, a vehicle seating assembly includes a seat base and a seat back. An inflatable bladder is disposed in at least one of the seat base and the seat back and is operable between an inflated position or to fold in accordion-like style to a deflated position. The inflatable bladder includes inner walls defining a plurality of orifices. A fan is configured to move air through the plurality of orifices.

According to yet another aspect of the present invention, a vehicle seating assembly includes an inflatable bladder assembly having a plurality of peripheral baffles. An airtight cavity is disposed in at least one of a seat base and a seat back and is operable between a deflated position and an inflated position. The inflatable bladder assembly includes inner walls defining a plurality of orifices. A fan is configured to move air through the plurality of orifices without influencing a pressure in the cavity.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
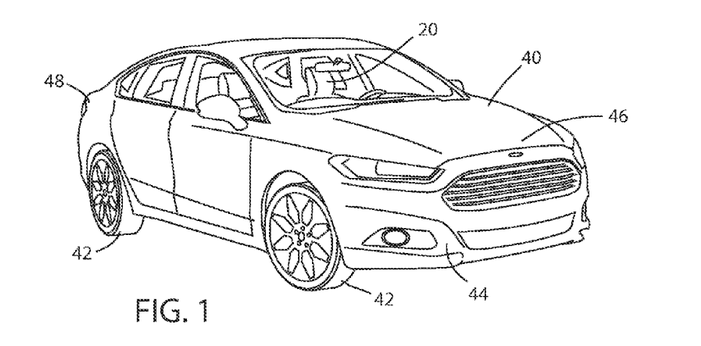
FIG. 1 is a front perspective view of a vehicle having a vehicle seat according to one embodiment of the present invention.
Figure 2:
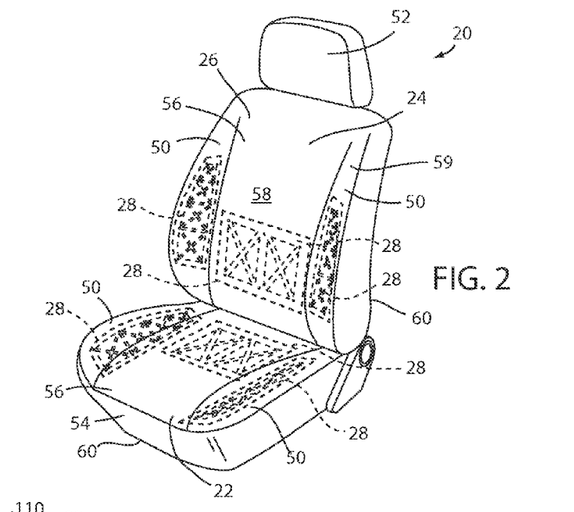
FIG. 2 is a front perspective view of the vehicle seat having a bladder according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIGS. 1-16, reference numeral 20 generally designates a vehicle seating assembly which includes a seat base 22 and a seat back 24. A cover stock 26 is disposed over the seat back 24 and the seat base 22. An inflatable bladder 28 is disposed in at least one of the seat base 22 and the seat back 24 and is configured to be in a first position 30, wherein the bladder 28 is deflated, and a second position 32, wherein the bladder 28 is inflated. The bladder 28 includes at least one orifice 34 extending completely through the inflatable bladder 28. A fan 36 is operably coupled to the at least one orifice 34 and is configured to move air through the at least one orifice 34 and the cover stock 26, thereby providing air flow to a vehicle passenger.

Referring again to FIG. 1, a vehicle 40 includes the vehicle seating assembly 20 and also includes other features such as multiple wheels 42, a bumper 44, a front end 46, and a rear end 48. The vehicle 40 may be of any type including a compact vehicle, mid-size vehicle, sport utility vehicle, a mini or full size van, or any type of truck. As illustrated in the embodiment shown FIG. 2, the vehicle seating assembly 20 includes the seat base 22 and the seat back 24. Each of the seat base 22 and the seat back 24 may include bolsters 50 disposed on each side of the seat base 22 or the seat back 24. The vehicle seating assembly 20 also includes a headrest 52. The cover stock 26 is disposed completely over the seat back 24 and the seat base 22. The cover stock 26 is configured to provide uniform look and feel to the vehicle seating assembly 20. The cover stock 26 also forms a passenger engagement surface 58 on a top surface of both the seat back 24 and the seat base 22 of the vehicle seating assembly 20. Both the seat back 24 and the seat base 22 include a cushioned portion 59 having an A-surface 56 disposed adjacent to the passenger engagement surface 58 and a B-surface 60 disposed on the opposite side of the passenger engagement surface 58. The vehicle seating assembly 20 further includes the inflatable bladder 28 disposed in at least one of the seat base 22, the seat back 24, or any of the bolsters 50. Moreover, multiple inflatable bladders 28 may be disposed in one or each of the seat base 22, the seat back 24 or any of the bolsters 50.

Figure 3:
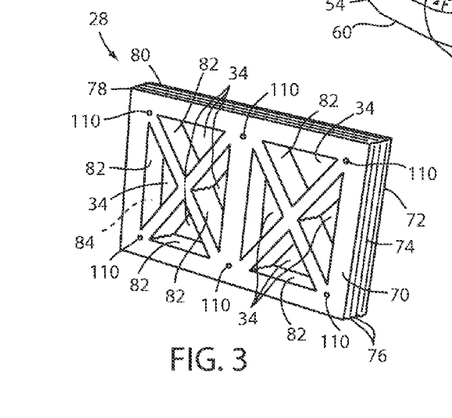
FIG. 3 is a top perspective view of a bladder according to one embodiment of the present invention.
Figure 4:
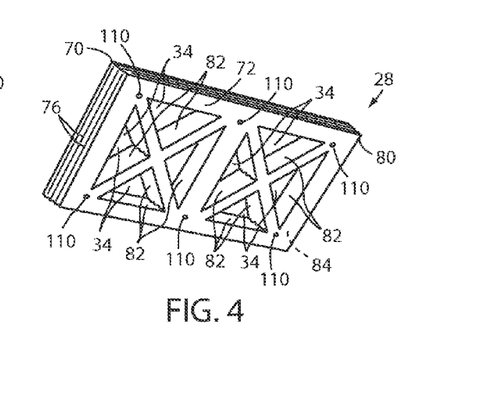
FIG. 4 is a bottom perspective view of the bladder of FIG. 3.

Referring now to the embodiment shown in FIGS. 3 and 4, the inflatable bladder 28 is disposed on the A-surface 56 of either the seat back 24, seat base 22, or any of the bolsters 50. The inflatable bladder 28 includes a top surface 70, a bottom surface 72, and a perimeter side wall 74 which connects the top surface 70 and the bottom surface 72. The top surface 70 and the bottom surface 72 are generally flat, rectangular shaped surfaces. The perimeter side wall 74 extends completely around the top 70 and bottom surfaces 72. The perimeter side wall 74 includes a plurality of peripheral baffles 76 which form an expandable accordion structure. It is also contemplated that the perimeter side wall 74 may include a single peripheral baffle 76. The peripheral baffles 76 are configured to be expanded when the inflatable bladder 28 is in the second position 32 and retract when the inflatable bladder 28 is in the first position 30. In another embodiment, the perimeter side wall 74 of the inflatable bladder 28 may be tapered such that a periphery 78 of the top surface 70 of the inflatable bladder 28 and a periphery 80 of the bottom surface 72 of the inflatable bladder 28 are unequal. The inflatable bladder 28 is generally comprised of a strong plastic polymer material however it is also contemplated that the inflatable bladder 28 may be comprised of steel, rubber, or any other material as used by one of ordinary skill in the art.

Referring again to the embodiment shown in FIGS. 3 and 4, the inflatable bladder 28 also includes inner side walls 82 which define the orifices 34. The peripheral baffles 76 of the perimeter side wall 74 along with the inner side walls 82 and the top surface 70 and bottom surface 72 define an air tight cavity 84. Moreover, the multiple orifices 34 extend completely through the top surface 70 and through the bottom surface 72. In the embodiment shown in FIGS. 3 and 4, the orifices 34 are generally triangular in shape and are arranged in a square-like arrangement. However, it is also contemplated that the orifices 34 may be circular, rectangular, diamond shaped, irregularly shaped, or any other shape as known by one of ordinary skill in the art. In the embodiment shown in FIG. 3, the inflatable bladder 28 includes a repeating pattern of four triangular shaped orifices 34 which form an X shape on the top surface 70 of the inflatable bladder 28. As shown in the embodiment shown in FIG. 4, the X shaped pattern is repeated on the bottom surface 72 of the inflatable bladder 28 showing the orifices 34 disposed completely through the inflatable bladder 28.

Figures 5, 6A, 6B:
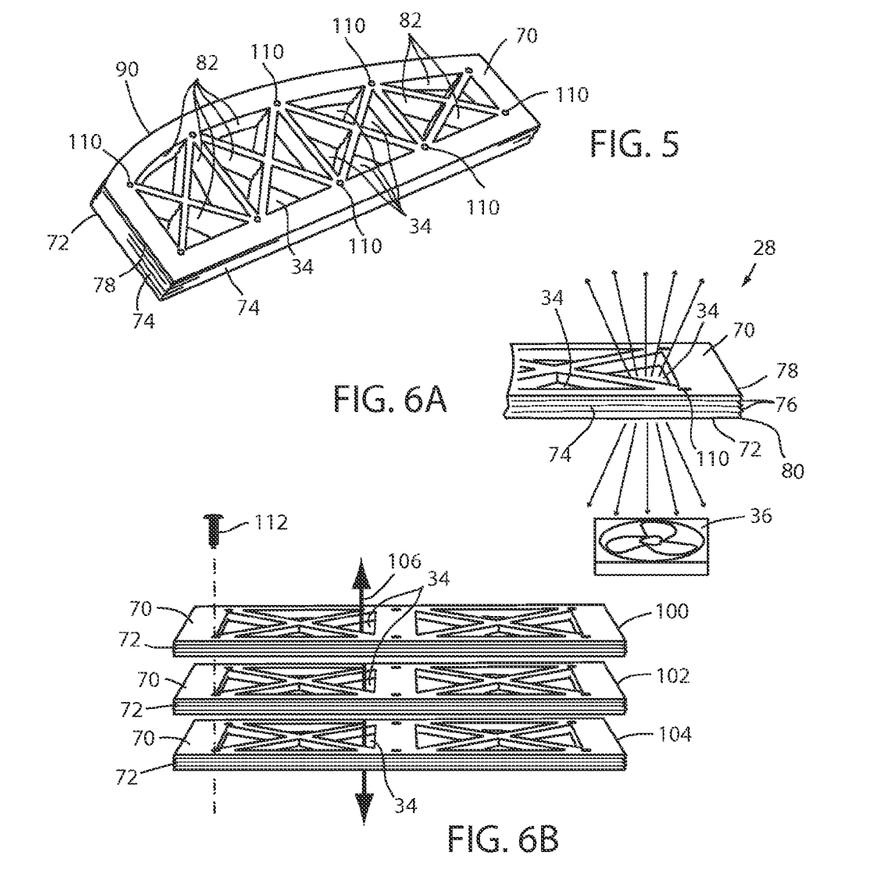
FIG. 5 is a top perspective view of one embodiment of a bladder for use in a bolster.
FIG. 6A is a partial side perspective view of one embodiment of the bladder through which air is passing.
FIG. 6B is a side perspective view of a bladder assembly including three air bladders.

Referring now to the embodiment shown in FIG. 5, the embodiment shown in FIG. 5 includes many of the same features as described above with respect to the inflatable bladder 28 shown in FIGS. 3 and 4, including the top surface 70, the bottom surface 72, and multiple orifices 34 disposed therethrough. Moreover, the embodiment shown in FIG. 5 also includes the perimeter side wall 74 including the plurality of peripheral baffles 76. However, the top surface 70 and the bottom surface 72 of the inflatable bladder 28 may include a curved edge 90. The curved edge 90 is specifically contoured to be disposed in curved portions of the seat base 22 or the seat back 24 such as the bolsters 50. It is also contemplated that the top surface 70 and bottom surface 72 may include more than one curved edge 90.

Referring now to the embodiment shown in FIG. 6A, as described above, the fan 36 is configured to move air through the plurality of orifices 34. Specifically, as shown in FIG. 6A, the fan 36 is configured to push or pull air through the orifices 34 of the inflatable bladder 28. The configuration of the orifices 34 allows a more uniform pressure inside of the inflatable bladder 28 in order to provide uniform pressure across the vehicle passenger engagement surface 58. The inflatable bladder 28 possesses the needed rigidity in order to allow the fan 36 to both push and pull air through the orifices 34 without affecting a pressure of the bladder 28 or moving the bladder 28. In the embodiment shown in FIG. 6A, the orifices 34 may be used to direct air flow that is being pushed in or pulled out of the orifices 34 in any direction in order to distribute and deliver the air flow to the vehicle passenger.

Referring now to the embodiment shown in FIG. 6B, the vehicle seating assembly 20 may include multiple inflatable bladders 28 which are disposed on top of one another. In the embodiment shown in FIG. 6B the bottom surface 72 of a first bladder 100 is disposed in abutting contact with the top surface 70 of a second bladder 102. Further, the bottom surface 72 of the second bladder 102 is in abutting contact with the top surface 70 of a third bladder 104. The inflatable bladders 100, 102, 104 are identical in shape and structure with each orifice 34 of the first bladder 100 being aligned with the orifice 34 in the second bladder 102 and the orifice 34 on the third bladder 104. The bladders 100, 102, 104 are stacked and aligned such that orifices 34 of each of the bladders are aligned and together define an air channel 106. The air channel 106 is operably coupled to the fan 36 and the fan 36 is configured to move air through the air channel 106, similar to the way the fan 36 is moving air through the orifice 34 of a single inflatable bladder, as shown in the embodiment shown in FIG. 6A.

Figures 7A, 7B, 7C:
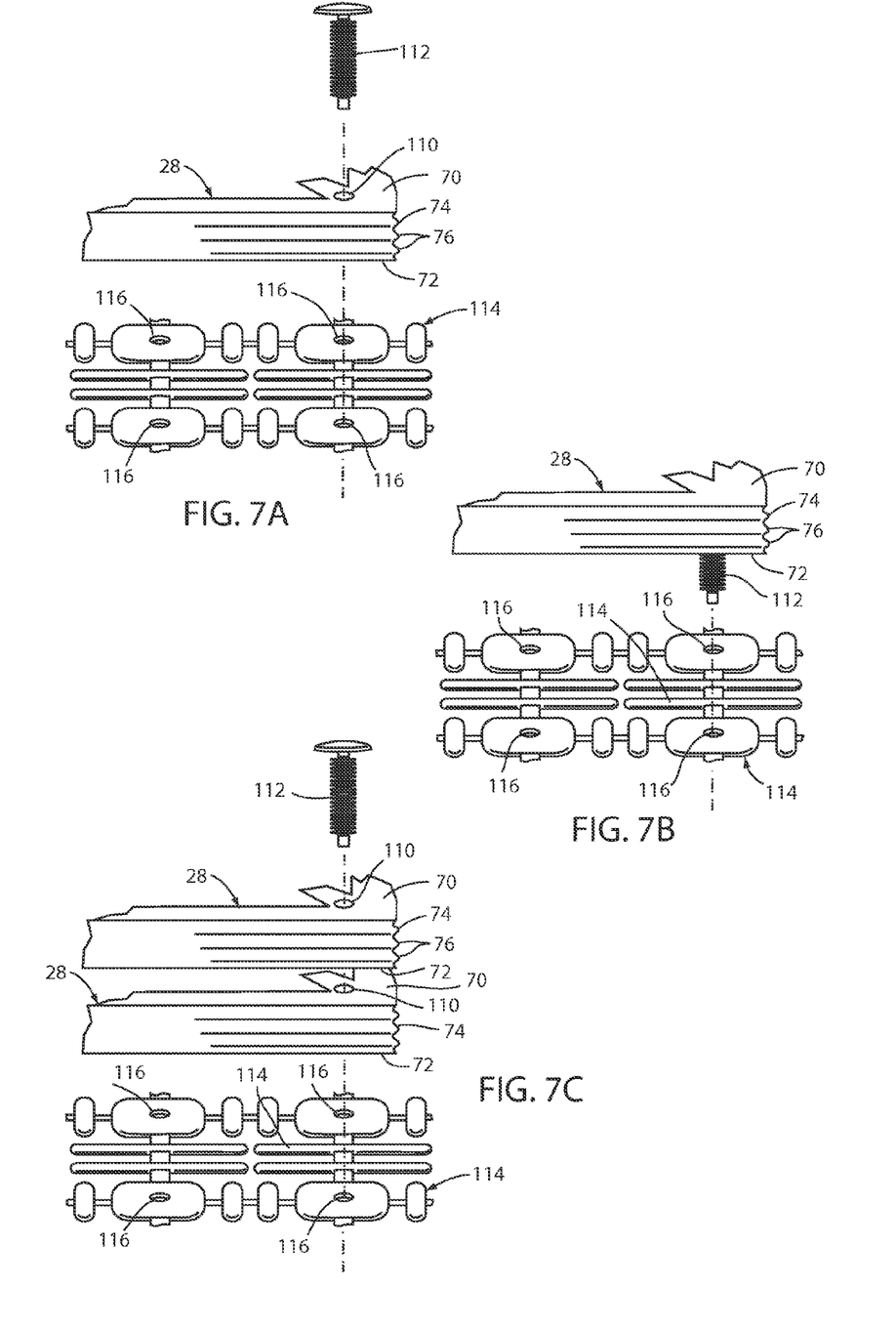
FIG. 7A is a partial side perspective view of a bladder attachment mechanism according to one embodiment of the present invention.
FIG. 7B is a partial side perspective view of the attachment mechanism of FIG. 7A during manufacturing.
FIG. 7C is a partial side perspective view of the attachment mechanism of FIG. 7A securing a bladder assembly including stacked bladders.

Referring now to the embodiment shown in FIGS. 7A-7C, the inflatable bladder 28 also includes at least one fastener aperture 110 disposed completely through the inflatable bladder 28. In the embodiment shown in FIGS. 3 and 4, the fastener apertures 110 are disposed adjacent the periphery 78 of the top surface 70 and extend through to the bottom surface 72. In the embodiment shown in FIGS. 3 and 4, the inflatable bladder 28 includes six fastener apertures 110. However, it is contemplated that the inflatable bladder 28 may include more or less than six fastener apertures 110. The fastener apertures 110 are configured to receive a fastener 112. The fastener 112 is configured to secure the inflatable bladder 28 to the vehicle seat assembly 20. In the embodiment shown in FIGS. 7A-7C, the inflatable bladder 28 is being secured to a flexible comfort carrier 114 which includes apertures 116 for receiving the fastener 112. During the assembly of the vehicle seat assembly 20, the comfort carrier 114 is disposed over or in the place of the foam cushioned portion 59 in the seat back 24 or the seat base 22, and the fastening apertures 110 of the inflatable bladder 28 are aligned with the receiving apertures 116 in the comfort carrier 114. The fastener 112 is then pressed through the fastener apertures 110 on the inflatable bladder 28 and into the receiving aperture 116 of the comfort carrier 114 in order to secure the inflatable bladder 28 to the comfort carrier 114. It is also contemplated, as shown in the embodiment shown in FIG. 8C, that multiple inflatable bladders 28 may be secured to the flexible comfort carrier 114 using the same fastening method as described above.

Referring now to the embodiment shown in FIG. 7B, it is contemplated that the inflatable bladder 28 may be constructed having the fastener 112 disposed inside of the inflatable bladder 28 and extending downward through the fastener aperture 110 in the bottom surface 72. In the embodiment shown in FIG. 8B, the fastener aperture 110 does not extend completely through the inflatable bladder. Specifically, the top surface 70 of the inflatable bladder 28 is free of fastener apertures 110 providing a smooth top surface 70. In the embodiment shown in FIG. 7B, the inflatable bladder 28 is fastened to the comfort carrier 114 similarly as described above. Specifically, the fastener 112 of the inflatable bladder 28 is aligned with the receiving aperture 116 of the comfort carrier 114. The fastener 112 is then pressed down into the apertures 116 of the comfort carrier 114 in order to secure the inflatable bladder 28 to the comfort carrier 114.

Figures 8A, 8B:
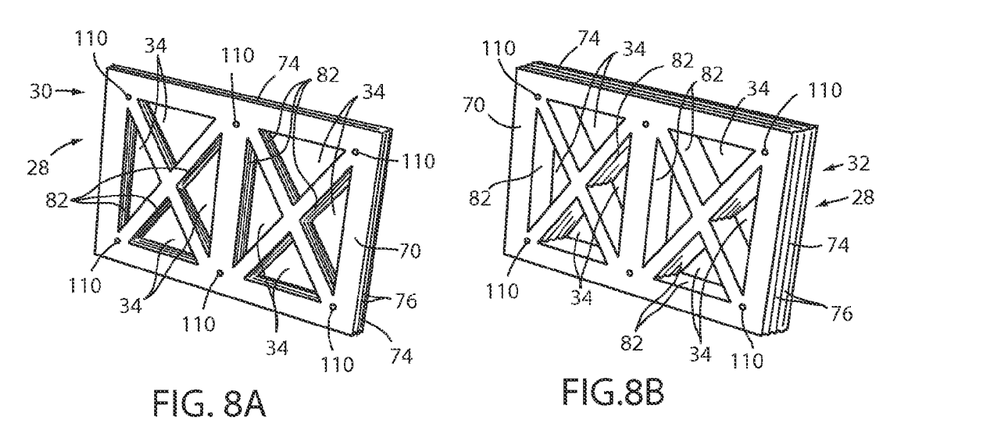
FIG. 8A is a top perspective view of a bladder in a deflated position according to one embodiment of the present invention.
FIG. 8B is a top perspective view of the bladder of FIG. 8A in an inflated position according to one embodiment of the present invention.
Figure 9:
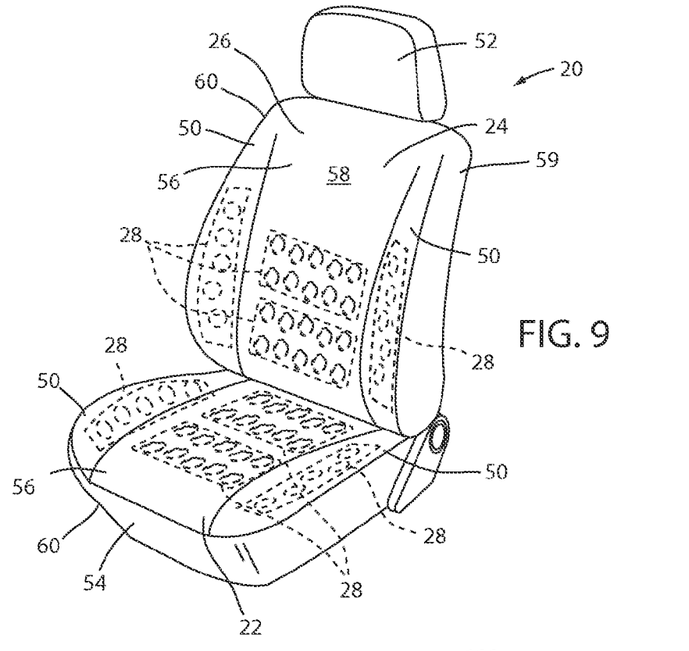
FIG. 9 is a front perspective view of one embodiment of the vehicle seat having a bladder according to one embodiment of the present invention.

Referring now to the embodiments shown in FIGS. 8A-8B, in operation, the inflatable bladder 28 is configured to be in the first position 30 where the inflatable bladder 28 is deflated and the second position 32 where the inflatable bladder 28 is inflated. As shown in FIG. 8A, when the inflatable bladder 28 is in the first position 30, the top surface 70 and the bottom surface 72 of the bladder 28 are in abutting contact with one another. The top surface 70 and the bottom surface 72 are aligned such that the orifices 34 extend completely through the inflatable bladder 28 with no intrusions. Additionally, the peripheral baffles 76, which define the accordion structure of the inflatable bladder are in a compressed state. As shown in the embodiment shown in FIG. 5B, when the inflatable bladder 28 is in the second position 32, the peripheral baffles 76 of the perimeter side wall 74 are extended in a generally accordion-like style, such that the top surface 70 and the bottom surface 72 are no longer in abutting contact. In the second position 32, air is disposed between the top surface 70 and the bottom surface 72 and the inflatable bladder 28 is configured to provide comfort and support to the vehicle passenger. In the second position 32, the orifices 34 are still lined up in the top surface 70 and the bottom surface 72 and form slightly longer orifices 34 due to the expansion of the perimeter side wall 74.

Referring again to the embodiment shown in FIGS. 8A and 8B, in operation, the inflatable bladder 28 begins in the first position 30 corresponding with the inflatable bladder 28 being deflated. The inflatable bladder 28 is then moved to the second position 32 corresponding with the inflatable bladder 28 being inflated usually by a pump or other inflation method. The orifices 34 are operably coupled to the fan 36 which is configured to push or pull air through the at least one orifice 34 and through the cover stock 26 in order to provide air flow to the vehicle passenger when the bladder 28 is in the first position 30 or the second position 32. It is contemplated that the cover stock 26 which is disposed over the seat base 22 and the seat back 24 may be perforated in order to allow air flow to easily be distributed to the vehicle passenger. However, it is also contemplated that the cover stock 26 may be comprised of a material such that air flow can be provided to the vehicle passenger without specific perforations. A height of the inflatable bladder in the inflated position is approximately 10 to 30 millimeters, and specifically approximately 20 millimeters greater than the height of the inflatable bladder in the deflated position.

Referring now to the embodiment shown in FIGS. 9-14, the vehicle seating assembly 20 may include many of the same features as described above, including the seat base 22, the seat back 24, the cover stock 26, the headrest 52, the plurality of bolsters 50 disposed on either the seat base 22 or the seat back 24, and the at least one inflatable bladder 28 disposed in at least one of the seat back 24, the seat base 22, or any of the bolsters 50. As shown in the embodiment shown in FIG. 9, the inflatable bladder 28 may be disposed and any or all of the seat back 24, the seat base 22, or any bolster 50.

Figure 10:
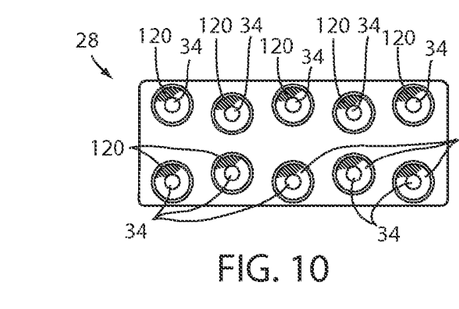
FIG. 10 is a top plan view of a bladder according to one embodiment of the present invention.
Figure 11:
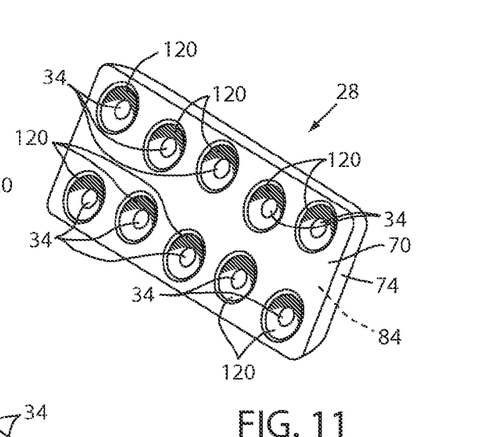
FIG. 11 is a top perspective view of the bladder of FIG. 10.
Figure 12:
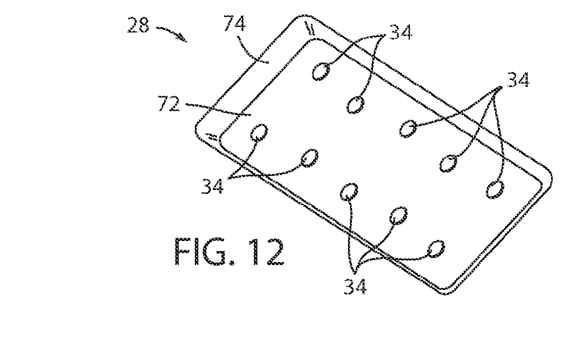
FIG. 12 is a bottom perspective view of the bladder of FIG. 10.

Referring specifically to FIGS. 10-12, like the previous embodiment, the inflatable bladder 28 includes the top surface 70, the bottom surface 72, and the perimeter side wall 74 which connects the top surface 70 and the bottom surface 72. However, the top surface 70 of the inflatable bladder 28, as shown in the embodiment shown in FIG. 10, includes a plurality of cupped portions 120. The cupped portions 120 are generally staggered across the top surface 70 of the inflatable bladder 28, however it is also contemplated that the cupped portions 120 may be in straight lines or any other pattern as understood by one having ordinary skill in the art. The cupped portions 120 also include orifices 34 disposed centrally in the cupped portion 120 which extend completely through the inflatable bladder 28. Again, the orifices 34 disposed in the inflatable bladder 28 are sealed orifices 34 such that the top surface 70, the bottom surface 72, the perimeter side wall 74, and the inner side walls 82 of the inflatable bladder 28 define the air tight cavity 84. As described above with respect to the embodiment shown in FIGS. 3 and 4, the top surface 70 and the bottom surface 72 are generally rectangular surfaces. However, in the embodiment shown in FIGS. 10-12, the perimeter side wall 74 may be slanted such that the top surface 70 and the bottom surface 72 of the inflatable bladder 28 are unequal in size.

Referring now to the embodiment shown in FIG. 12, as described above, the bottom surface 72 of the inflatable bladder 28 is a generally flat surface which includes the plurality of orifices 34 which extend completely through the inflatable bladder 28. The plurality of orifices 34 are operably coupled to the fan 36. As described above, the fan 36 is configured to move air through the plurality of orifices 34 without affecting the pressure inside of the inflatable bladder 28. It is also contemplated that the fan 36 may draw or blow air through the orifices 34.

Figure 13:
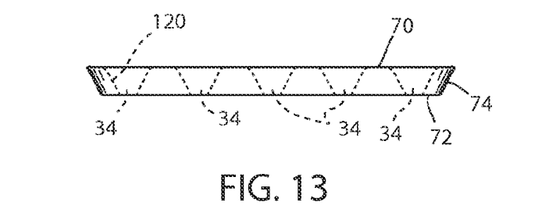
FIG. 13 is a side plan view of the bladder of FIG. 10.
Figure 14:
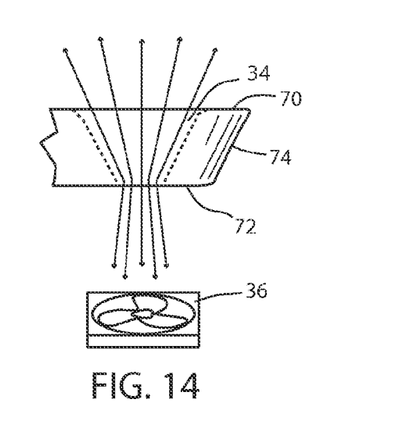
FIG. 14 is a partial side plan view of the bladder of FIG. 10 with air passing therethrough.

Referring now to the embodiments shown in FIGS. 13 and 14, the orifices 34 of the inflatable bladder 28 are configured to move air in any direction through the plurality of orifices 34. As shown in the embodiment shown in FIG. 14, the cupped portion 120 allows the air moved into the orifice 34 by the fan 36 to be disbursed at multiple angles in order to provide various directions of air flow to the vehicle passenger.

Figure 15:
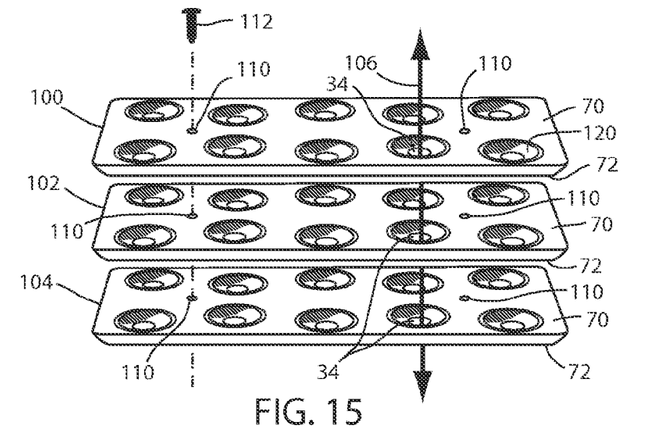
FIG. 15 is a side perspective view of a bladder assembly including three stacked bladders according to one embodiment of the present invention.

Referring now to the embodiment shown in FIG. 15, the vehicle seating assembly 20 may include many of the same features as described above with respect to the embodiment shown in FIGS. 7A-7C, including the fastener apertures 110, fasteners 112, and the comfort carrier 114. As described above, the inflatable bladders 28 may be stacked on top of each other having the orifices 34 of one bladder being aligned with the orifices 34 of another bladder and defining the air channel 106.

Figure 16A:
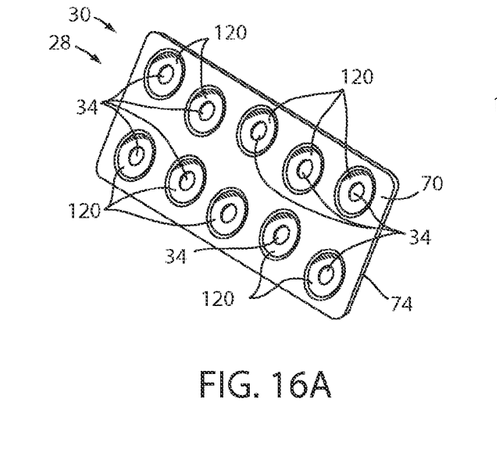
FIG. 16A is a top perspective view of the bladder of FIG. 10 in a deflated position.
Figure 16B:
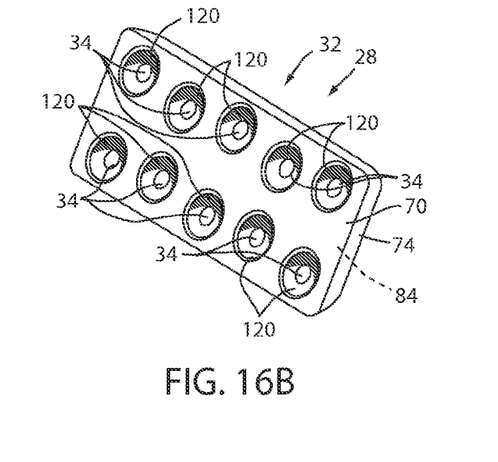
FIG. 16B is a top perspective view of the bladder of FIG. 10 in an inflated position.

With reference to the embodiment shown in FIGS. 16A and 16B, the embodiment shown in FIGS. 16A and 16B operates similar to the embodiment shown in FIGS. 8A and 8B. Specifically, the inflatable bladder 28 begins in the first position 30 corresponding with the inflatable bladder 28 being deflated. In this position, the top surface 70 of the inflatable bladder 28 and the bottom surface 72 of the inflatable bladder 28 are in abutting contact. In the second position 32, corresponding with the inflatable bladder 28 being inflated, air is disposed between the top surface 70 and the bottom surface 72 such that the top surface 70 and the bottom surface 72 are not in abutting contact. As described above, the height of the inflatable bladder 28 in the second position 32 is approximately 10 to 30 millimeters, and specifically approximately 20 millimeters, greater than the height of the inflatable bladder 28 in the first position 30. In operation, the fan 36 is operably coupled to the orifices 34 of the inflatable bladder 28 and is configured to push or pull air through the orifices 34 in order to provide air flow to the vehicle passenger.

Yet another aspect of the present invention is to provide improved air flow technology in order to increase comfort to the vehicle passenger. Prior art inflatable bladder systems include solid bladders that do not allow air flow. This forces the bladders to be mounted on the B-surface 60, or bottom surface of the seating foam. Placing the inflatable bladders underneath the seating foam forces the bladders to have to compress the foam in order to support the occupant. The present invention allows the inflatable bladder 28 to be disposed on the A-surface 56, or top surface of the seating foam. This allows a lower expansion height by the inflatable bladder 28 in order to provide similar support to the occupant. The inflatable bladder 28 of the present invention includes punch holes or orifices 34 which are disposed completely through the inflatable bladder 28 and operably coupled to the fan 36. The orifices 34 can be used to direct the air flow that is being pushed or pulled out from a cooling or heating system in order to distribute and deliver the air flow to the vehicle passenger.

It is to be understood that variations and modifications can be made on the aforementioned structure without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a seat base;
   a seat back;
   a cover stock disposed over the seat back and the seat base;
   a first bladder disposed in at least one of the seat base and the seat back and configured to be in a first position, wherein the first bladder is deflated, and a second position, wherein the first bladder is inflated to define a first pressurized pocket, wherein the first bladder includes at least one orifice extending completely through the first bladder;
   a second bladder disposed in at least one of the seat base and the seat back and configured to be in a first position, wherein the second bladder is deflated, and a second position, wherein the second bladder is inflated to define a second pressurized pocket, wherein the second bladder includes at least one orifice extending completely through the second bladder;
   an air channel defined by the at least one orifice of the first bladder and the at least one orifice of the second bladder, the channel extending through the first and second bladders without communicating with the first and second pressurized pockets; and
   a fan operably coupled to the air channel and configured to move air through the air channel and the cover stock, thereby providing air flow to a vehicle passenger.

2. The vehicle seating assembly of claim 1, wherein the first and second bladders include a polymeric fastener that secures the first and second bladders to a comfort carrier.

3. The vehicle seating assembly of claim 1, wherein the seat base includes a seating foam having a top side and a bottom side, and wherein the first and second bladders are disposed on the top side of the seating foam.

4. The vehicle seating assembly of claim 1, wherein the seat back includes a seating foam having a forward side and a rearward side, and wherein the first and second bladders are disposed on the forward side of the seating foam.

5. The vehicle seating assembly of claim 1, wherein the inflatable bladder includes a plurality of cupped portions, and wherein the at least one orifice extends through the cupped portions.

6. The vehicle seating assembly of claim 5, wherein the cupped portions are disposed in a staggered configuration across the inflatable bladder.

7. The vehicle seating assembly of claim 1, wherein the first and second bladders include a plurality of peripheral baffles defining an expandable accordion structure.

8. The vehicle seating assembly of claim 1, wherein a height of the first and second bladders in the second position is approximately 10-30 mm greater than the height of the first and second bladders in the first position.

9. A vehicle seating assembly comprising:
  a seat base;
  a seat back;
  a plurality of stacked generally uniform inflatable bladders disposed in at least one of the seat base and the seat back and operable to an inflated position and to fold in accordion-like style to a deflated position, each inflatable bladder defining an airtight cavity, wherein the inflatable bladders include inner walls defining a plurality of orifices; and
  a fan configured to move air through the plurality of orifices.

10. The vehicle seating assembly of claim 9, wherein the inflatable bladders include at least three bladders stacked and aligned such that orifices of each of the bladders are aligned to define an air channel.

11. The vehicle seating assembly of claim 9, wherein the inflatable bladders have a tapered side wall such that a periphery of a top of the inflatable bladders and a bottom of the inflatable bladders are unequal.

12. The vehicle seating assembly of claim 9, wherein the inflatable bladder includes a cupped portion proximate each of the plurality of orifices.

13. The vehicle seating assembly of claim 9, wherein a height of the inflatable bladders in the inflated position is approximately 10-30 mm greater than the height of the inflatable bladders in the deflated position.

14. The vehicle seating assembly of claim 9, wherein the inflatable bladders include fastener apertures configured to receive a fastener that secures the inflatable bladders to a flexible comfort carrier.

15. The vehicle seating assembly of claim 9, wherein the inflatable bladders include a fastener having a strong plastic polymer material.

16. A vehicle seating assembly comprising:
  an inflatable bladder assembly having a stack of like bladders including peripheral baffles, each bladder defining an airtight cavity disposed in at least one of a seat base and a seat back and operable between deflated and inflated conditions;
  a plurality of orifices defined by inner walls of each bladder; and
  a fan configured to move air through the plurality of orifices without influencing a pressure in the cavity.

17. The vehicle seating assembly of claim 16, wherein the inflatable bladder assembly is disposed in side bolsters of at least one of the seat base and the seat back.

18. The vehicle seating assembly of claim 16, wherein the inflatable bladder assembly includes a plurality of cupped portions, and wherein the plurality of orifices extend through the cupped portions.

19. The vehicle seating assembly of claim 18, wherein the cupped portions are disposed in a staggered configuration across the inflatable bladder assembly.

20. The vehicle seating assembly of claim 16, wherein the inflatable bladder assembly includes an accordion-like structure configured to retract and expand when the inflatable bladder assembly moves between the deflated and inflated conditions, respectively.

* * * * *